United States Patent

Oosedo et al.

[11] Patent Number: 6,046,257
[45] Date of Patent: Apr. 4, 2000

[54] COMPOSITION FOR PREPREG COMPRISING EPOXY RESIN, POLYAMIDE BLOCK COPOLYMER AND CURING AGENT

[75] Inventors: Hiroki Oosedo; Shunsaku Noda, both of Ehime-ken, Japan

[73] Assignee: Toray Industries, Inc., Japan

[21] Appl. No.: 08/615,996

[22] Filed: Mar. 18, 1996

Related U.S. Application Data

[63] Continuation of application No. PCT/JP95/01430, Jul. 18, 1995, abandoned.

[51] Int. Cl.[7] .............................. C08K 7/06; C08K 7/08; C08K 7/10; C08K 7/14

[52] U.S. Cl. ................ 523/428; 523/427; 523/429; 523/445; 523/457; 523/458; 523/466; 523/468; 525/61; 525/113; 525/114; 525/118; 525/423; 525/438

[58] Field of Search ............................ 525/423, 61, 113, 525/114, 118, 438; 523/427, 428, 429, 445, 457, 458, 466, 468

[56] References Cited

U.S. PATENT DOCUMENTS

| | | | |
|---|---|---|---|
| 4,822,683 | 4/1989 | Schappert et al. | 428/414 |
| 5,030,698 | 7/1991 | Mulhaupt et al. | 525/423 |
| 5,310,827 | 5/1994 | Komiya et al. | 525/419 |

FOREIGN PATENT DOCUMENTS

| | | |
|---|---|---|
| 60-18562 | 1/1985 | Japan . |
| 62-260816 | 11/1987 | Japan . |
| 2-1724 | 1/1990 | Japan . |
| 3-29209 | 2/1991 | Japan . |
| 5-17670 | 1/1993 | Japan . |
| 7-26130 | 1/1995 | Japan . |
| 7-138367 | 5/1995 | Japan . |

*Primary Examiner*—Robert E. Sellers
*Attorney, Agent, or Firm*—Morrison Foerster LLP

[57] ABSTRACT

A composition is useful as a prepreg containing reinforcing fibers comprises an epoxy resin, a thermoplastic elastomer of a polyamide and/or polyester block copolymer, a curing agent such as dicyandiamide, and optionally a thermoplastic resin such as a polyvinyl formal resin.

9 Claims, No Drawings

US 6,046,257

COMPOSITION FOR PREPREG COMPRISING EPOXY RESIN, POLYAMIDE BLOCK COPOLYMER AND CURING AGENT

This application is a continuation of International Application No. PCT/JP95/01430, filed Jul. 18, 1995, now abandoned.

TECHNICAL FIELD

The present invention relates to an epoxy resin composition used to prepare a prepreg excellent in tackiness and drapability, and also to a prepreg and a fiber reinforced composite material respectively obtained from the resin composition.

BACKGROUND OF THE INVENTION

Composite materials respectively composed of reinforcing fibers and a matrix resin are widely used as sporting goods such as golf shafts, fishing rods and tennis rackets, and for aerospace and general industrial applications, since they are light in weight and excellent in mechanical properties.

Fiber reinforced composite materials are produced by various methods. It is widely practiced to use a sheet obtained by impregnating reinforcing fibers with a matrix resin as an intermediate product called a prepreg. In this method, plural prepreg sheets are laminated and heated to obtain a molded product.

The matrix resin used for the prepreg can be either a thermosetting resin or a thermoplastic resin, but in most cases, a thermosetting resin is used. Above all, an epoxy resin is mainly used.

When prepreg sheets obtained by using an epoxy resin are used, the tackiness between the prepreg sheets and the drapability of the prepreg often come into question. These properties greatly affect the working efficiency in the handling of the prepreg.

If the tackiness of the prepreg is too small, the prepreg sheets overlapped and pressed in the prepreg sheet lamination step are soon separated to inconvenience the lamination work. In this case, the working environment temperature must be raised to a level at which moderate tackiness can be obtained.

On the contrary, if the tackiness of the prepreg is too large, prepreg sheets which happen to be overlapped by any error stick to each other due to their own weight, and it is difficult to separate them for correction.

Furthermore, if the drapability of the prepreg sheet is poor, the prepreg sheets are so hard as to remarkably lower the lamination workability, and the laminated prepreg sheets cannot be accurately adapted to the curved surface of the mold or the form of the mandrel, to be creased or to get the reinforcing fibers broken, for forming defects in the molded product. Also in this case, the working environment temperature must be kept high, and it is difficult to keep the balance between drapability and tackiness. So, these properties are very large problems for molding work.

These problems are especially liable to be caused when a golf shaft or fishing rod, etc. is molded by winding the prepreg sheets around the mandrel. If the balance between tackiness and drapability is improper, the prepreg sheets wound around the mandrel are exfoliated in a short time, to make molding difficult.

Furthermore, if the prepreg sheets are allowed to stand before use, their tackiness declines rapidly in several hours, and they can be only poorly wound around the mandrel, to make lamination work difficult. So, it is also required to keep moderate tackiness for a long time.

The tackiness and drapability of the prepreg are mainly dominated by the viscoelasticity of the matrix resin. In general, the viscoelasticity of an epoxy resin greatly depends on the temperature, and if the working environment temperature varies seasonally, the tackiness and drapability vary, and sometimes working cannot be effected.

Furthermore in the molding with a prepreg used, resin flow often comes into question. The resin flow refers to the flow of the resin when the temperature rises in the molding step. In general, since the molding with a prepreg used is effected under pressure, large resin flow causes the resin to flow out, and the product tends to deviate from design values of resin percentage and thickness. Furthermore, if the resin flow is large, a phenomenon that fine bubbles in the resin gather during molding, to form voids in the molded product, for lowering the strength of the molded product.

In recent years, golf shafts, fishing rods, etc. are reduced in weight, and prepregs suitable for light weight design are desired. Prepregs using fibers high in elastic modulus, especially carbon fibers high in elastic modulus as reinforcing fibers are especially demanded in the market in recent years since they allow easy light weight design.

However, the use of carbon fibers high in elastic modulus as reinforcing fibers lowers the drapability of the prepreg, and therefore, there is also a tendency to show the nature that the resin on the surface of the prepreg settles with the lapse of time, to lower tackiness. Therefore, if any conventional resin is used, both tackiness and drapability are insufficient disadvantageously.

For higher drapability, lowering the viscosity of the resin is generally considered to be effective. However, simply lowering the viscosity of the resin causes the disadvantages based on the large resin flow as described above.

Epoxy resin compositions containing a high molecular epoxy resin for the purpose of optimizing the tackiness and drapability of the prepreg to improve the molding workability are disclosed in Japanese Patent Laid-Open Nos. 62-127317 and 63-308026. Furthermore, Japanese Patent Laid-Open No. 2-20546 discloses an epoxy resin composition containing a nitrile rubber modified epoxy resin for the purpose of optimizing drapability and resin flow.

However, even though these methods could improve either the tackiness or drapability of the prepreg, they have a disadvantage that the balance between both the properties is improper or that the balance is achieved at the sacrifice of the mechanical properties of the molded product obtained.

Furthermore, as a method for improving the tackiness, etc. of the prepreg, it is known to add a high polymer such as a thermoplastic resin or elastomer to an epoxy resin. For example, adding a polyvinyl formal resin as disclosed in Japanese Patent Laid-Open Nos. 58-8724 and 62-169829, adding a polyvinyl acetal resin as disclosed in Japanese Patent Laid-Open Nos. 55-27342, 55-108443 and 56-2119, adding a polyvinyl butyral resin as disclosed in Japanese Patent Laid-Open No. 52-30187, adding a polyester polyurethane as disclosed in Japanese Patent Laid-Open No. 5-117423, adding a polyvinyl ether as disclosed in Japanese Patent Laid-Open No. 4-130156, etc. are known.

However, adding such a high polymer raises the viscosity of the resin, for lowering drapability, and it is difficult to find any resin satisfactory in both drapability and tackiness especially in any prepreg using carbon fibers high in elastic modulus.

Japanese Patent Laid-Open Nos. 2-92920 and 4-46923 disclose compositions consisting of an epoxy resin, polyester based thermoplastic elastomer and curing agent. However, these compositions are intended to improve the tensile strength and impact resistance of composite materials, and nothing is discussed about the problem of improving tackiness at the sacrifice of drapability and impregnability, while no means for solving the problem is suggested.

European Patent No. 381625 (corresponding to Japanese Patent Laid-Open No. 2-233754) discloses an epoxy resin composition comprising epoxy resin, liquid copolymer based on butadiene and acrylonitrile, and segmented copolymer such as copolyester, copolyamide, etc., which is used as a hot melt adhesive for structures, matrix resin or surface coating material. However, for this composition, the problem of improving tackiness at the sacrifice of drapability and impregnability is not discussed at all, and no means for solving it is suggested. In addition, if a liquid copolymer based on butadiene and acrylonitrile is added, the resin composition obtained and cured is low in heat resistance and elastic modulus, and the fiber reinforced composite material obtained by curing the prepreg produced by using the resin composition as the matrix resin is not sufficient in such physical properties as heat resistance and 0° compressive strength.

Furthermore, the fiber reinforced composite material obtained by curing the prepreg produced by simply using the epoxy resin composition containing such a thermoplastic elastomer as the matrix resin is insufficient in such physical properties as inter-layer shear strength, 90° tensile strength and no compressive strength. This phenomenon is surmised to be caused by the low adhesiveness between the matrix resin and the reinforcing fibers.

On the other hand, many attempts were made to improve the inter-layer toughness for enhancing the impact resistance, especially compressive strength after impact of any fiber reinforced composite material obtained by laminating and curing prepreg sheets. For example, U.S. Pat. No. 3,472,730, U.S. Pat. No. 4,539,253 (corresponding to Japanese Patent Laid-Open No. 60-231738), U.S. Pat. No. 4,604,319, Japanese Patent Laid-Open Nos. 51-58484 (Japanese Publication No. 58-31296), 54-3879, 56-115216, 6044334, 60-63229, 63-162732, and 58-205758, and Japanese Patent Publication No. 61-29265 disclose techniques for enhancing the inter-layer strength by arranging a film or fine particles, etc. of a thermosetting resin or thermoplastic resin.

However, unlike the case of using, as the matrix resin, a composition obtained by dissolving a thermoplastic resin into an epoxy resin, the thermoplastic resin and the epoxy resin composition exist in quite discrete phases. If a thermoplastic resin film covers the entire surface of the epoxy resin composition, the surface loses the tackiness of the epoxy resin composition. If thermoplastic resin particles are used, the epoxy resin composition is sufficiently exposed on the surface, and does not lose its tackiness, but the tackiness almost remains at the level achieved without using the grains, and cannot be further improved. Moreover, no material satisfactory in heat resistance, tackiness, impact resistance and the strength as the entire composite material could be obtained.

Furthermore, since golf shafts, fishing rods, etc. are reduced in weight, there is a higher demand for a prepreg higher in reinforcing fiber content.

In general, if the reinforcing fiber content is made higher, the amount of the resin distributed on the surface of the prepreg is decreased to lower tackiness. If a resin high in viscosity containing a high polymer as described before is used for example to improve tackiness, the high viscosity makes impregnation difficult in addition to the difficulty of impregnating the reinforcing fiber bundles with a resin at a high reinforcing fiber content, to lower the quality of the prepreg such as smoothness.

Especially in the case of a prepreg sheet using carbon fibers high in elastic modulus as reinforcing fibers and high in reinforcing fiber content, it is very difficult to satisfy all of tackiness, drapability and quality.

The object of the present invention is to provide a prepreg excellent in tackiness, drapability and quality and also excellent in physical properties after curing, even if carbon fibers high in elastic modulus are used or even the reinforcing fiber content is high.

DISCLOSURE OF THE INVENTION

The inventors found that a prepreg obtained by using an epoxy resin composition containing a specific thermoplastic elastomer is excellent in the balance of properties such as tackiness and drapability. Thus, the present invention has been completed.

The first version of the present invention is an epoxy resin composition comprising at least a polyamide based thermoplastic elastomer and a curing agent.

The second version of the present invention is an epoxy resin composition comprising at least the following components [A], [B], [C] and [D]:

[A]: An epoxy resin

[B]: A polyester based or polyamide based thermoplastic elastomer

[C]: A thermoplastic resin

[D]: A curing agent

THE MOST PREFERRED EMBODIMENTS OF THE INVENTION

The epoxy resin used for the epoxy resin composition of the present invention can be a compound with plural epoxy groups in the molecule. Especially an epoxy resin with an amine, phenol or a compound with carbon-carbon double bond as a precursor is preferable. It can be selected, for example, from bisphenol type epoxy resins such as bisphenol A type epoxy resin, bisphenol F type epoxy resin, and bisphenol S type epoxy resin, naphthalene type epoxy resin, novolak type epoxy resins such as phenol novolak type epoxy resin, an cresol novolak type epoxy resin, glycidylamine type epoxy resins such as tetraclycidyldiaminodiphenylmethane, triglycidylaminophenol, and tetraglycidylxylenediamine, glycidyl ether type epoxy resins such as tetrakis (glycidyloxyphenyl)ethane, and tris(glycidyloxy)methane, and any combination of the foregoing.

Examples of the bisphenol type epoxy resins include "Epikote" 828, "Epikote" 1001, and "Epikote" 1004 (produced by Yuka Shell Epoxy K.K.), and YD128 (produced by Toto Kasei K.K.), "Epicron" 840, "Epicron" 850, "Epicron" 855, "Epicron" 860, and "Epicron" 1050 (produced by Dainippon Ink & Chemicals, Inc.), ELA128 (produced by Sumitomo Chemical Co., Ltd.), DER331 (produced by Dow Chemical), etc. as marketed bisphenol A type epoxy resins, and these have the following chemical structure.

In the chemical formula, n stands for a positive number.

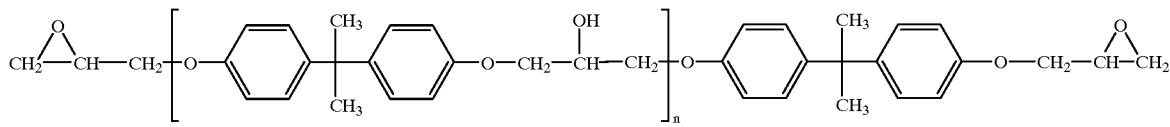

Examples of marketed bisphenol F type epoxy resins include "Epicron" 830 (produced by Dainippon Ink & Chemicals, Inc.), "Epilote" 807 (Yuka Shell Epoxy K.K.), etc. and these have the following chemical structure.

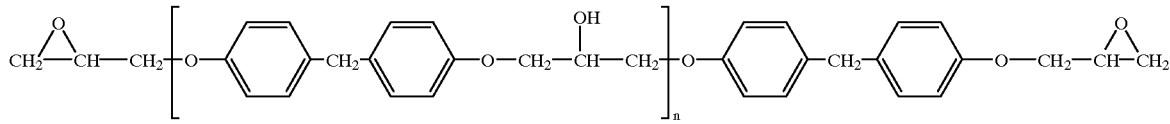

Examples of marketed phenol novolak type epoxy resins include "Epikote" 152, and "Epikote" 154 (produced by Yuka Shell Epoxy K.K.), DER485 (produced by Dow Chemical), EPN 1138, and 1139 (produced by Ciba Geigy), etc. and these have the following chemical structure.

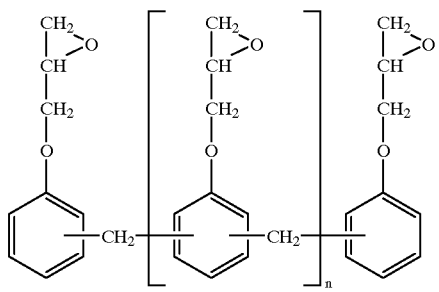

It is preferable that the epoxy resin [A] has both a bi-functional (with two epoxy groups per molecule) epoxy resin and a tri- or higher-functional epoxy resin for optimizing the elongation, elastic modulus, and heat resistance of the matrix resin by controlling the crosslinking density. However, if the content of the tri- or higher-functional epoxy resin is too large, the elongation becomes small even though the elastic modulus and heat resistance can be improved. So, the content is properly optimized to suit each purpose.

It is preferable that the bi-functional epoxy resin used here is a mixture consisting of a liquid biifunctional epoxy resin low in molecular weight and a solid bi-functional epoxy resin high in molecular weight, to control the viscosity of the epoxy resin composition. The liquid bi-functional epoxy resin is preferably 200 to 600, more preferably 300 to 400 in average molecular weight. The solid bi-functional epoxy resin is preferably 800 to 10000, more preferably 850 to 4000 in average molecular weight.

Above all, the liquid bi-functional epoxy resin is preferably a bisphenol A type epoxy resin or bisphenol F type epoxy resin, and can be selected from such marketed products as "Epikote" 828, "Epikote" 807, "Epicron" 850, "Epicron" 855, "Epicron" 830, ELA128, DER331, etc. The solid bi-functional epoxy resin is preferably a bisphenol A type epoxy resin, and can be selected from such marketed products as "Epikote" 1001, "Epikote" 1005, "Epicron" 1050, etc.

As the tri- or higher-functional epoxy resin, phenol novolak resin is especially preferable among those enumerated above, in view of the control of resin viscosity and the balance of elastic modulus, heat resistance, etc.

The epoxy resin [A] is used in combination with the curing agent [D]. The curing agent can be any compound with an active group capable of reacting with an epoxy group.

The curing agent can be selected from aromatic amines such as diaminodiphenylmethane, and diaminodiphenylsulfone, aliphatic amnines, imidazole derivatives, dicyandiamide, tetramethylguanidine, thiourea added amine, carboxylicanhydrides such as methylhexahydrophthalicanhydride, carboxylic acid hydrazides, carboxylic acid amides, polyphenol compounds, novolak resins, polymercaptan, Lewis acid complexes such as boron trifluoride ethylamine complex, etc.

Any of these curing agents can be microcapsuled for ideal use to enhance the storage stability of the prepreg.

Any of these curing agents can be used in combination with a proper curing accelerator to enhance curing activity. As preferable examples, dicyandiamide can be used in combination with 3-(3,4-dichlorophenyl)-1,1-dimethylurea (DCMU) used as a curing accelerator, and a carboxylicanhydride or novolak resin can be used in combination with a tertiary amine used as a curing accelerator.

Any of these epoxy resins and any of these curing agents, and, as the case may be, a preliminary reaction product obtained by using parts of them can also be added to the composition.

The epoxy resin composition of the present invention contains a polyamide based thermoplastic elastomer in the first version of the present invention, and a polyester based or polyamide based thermoplastic elastomer in the second version of the present invention.

The polyester based or polyamide based thermoplastic elastomer is a block copolymer consisting of a hard segment component and a soft segment component, and has a structure of polyester component or polyamide component as the hard segment component. The copolymer is lower than room temperature in glass transition point and higher than room temperature in melting point.

The structure of the hard segment component can be selected from those enumerated below. A plurality of these structures can also be contained in one polymer. A polyester component and/or a polyamide component can be used to form the hard segment component. In the first version of the present invention, at least a polyamide component is used as an essential component. The melting point of the polyester based or polyamide based thermoplastic elastomer affects the heat resistance of the epoxy resin composition after curing, and so is preferably 100° C. or higher, more preferably 140° C. or higher.

Unless otherwise specified, n, m, l, p and q in the following formulae stand for respectively a natural number.

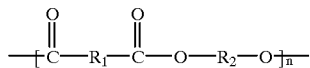
(I)

(where $R_1$ stands for an aromatic group; $R_2$, an alkylene group with 2 to 4 carbon atoms.)

$R_1$ can be, for example, a p-phenylene group, or m-phenylene group. $R_2$ can be, for example, an ethylene group, or tetramethylene group.

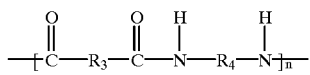
(II)

(where $R_3$ and $R_4$ stand for, respectively independently, an alkylene group with 2 to 10 carbon atoms.)

$R_3$ can be, for example, a tetramethylene group, heptamethylene group, octamethylene group, or decamethylene group. $R_4$ can be, for example, a tetramethylene group, or hexamethylene group.

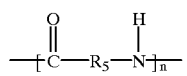
(III)

(where $R_5$ stands for an alkylene group with 2 to 12 carbon atoms.)

$R_5$ can be, for example, a pentamethylene group, decamethylene group, or undecamethylene group.

As the soft segment component, a structure containing an aliphatic polyether or aliphatic polyester is suitable. Examples of the structure are enumerated below.

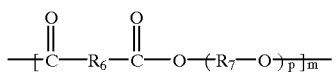
(IV)

(where $R_6$ stands for a divalent aromatic group or alkylene group with 2 to 12 carbon atoms; $R_7$, an alkylene group with 2 to 4 carbon atoms; and p, an integer of 2 or more.)

$R_6$ can be, for example, p-phenylene group, m-phenylene group, tetramethylene group, or decamethylene group. $R_7$ can be, for example, an ethylene group, propylene group, or tetramethylene group. In the general formula (IV), p is preferably an integer of 6 to 10.

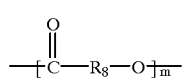
(V)

(where $R_8$ stands for an alkylene group with 2 to 12 carbon atoms.)

$R_8$ can be, for example, a pentamethylene group.

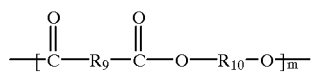
(VI)

(where $R_9$ stands for an alkylene group with 2 to 12 carbon atoms; and $R_{10}$, an alkylene group with 2 to 12 carbon atoms.)

$R_9$ can be, for example, a tetramethylene group, octamethylene group, or decamethylene group.

$R_{10}$ can be, for example, an ethylene group, or tetramethylene group.

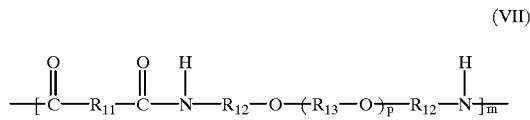
(VII)

(where $R_{11}$ stands for an alkylene group with 2 to 12 carbon atoms; $R_{12}$ and $R_{13}$, respectively independently, an alkylene group with 2 to 4 carbon atoms; and p, an integer of 2 or more.)

$R_{11}$ can be, for example, a tetramethylene group, heptamethylene group, octamethylene group, or decamethylene group. $R_{12}$ can be, for example, an ethylene group, trimethylene group, or propylene group. $R_{13}$ can be, for example, an ethylene group, propylene group, or tetramethylene group. In the general formula (IV), p is preferably an integer of 6 to 10.

In addition to the above, another copolymer component or structure can also be contained. The other copolymer component can be a compound containing a phenolic hydroxyl group such as bisphenol A or hydroxybenzoic acid. The other structure can be a copolymer block with carbonate bonds or urethane bonds, etc.

Among those enumerated above, a hard segment with its structure represented by said general formula (I) or (III) is high in melting point, and excellent in the heat resistance of the epoxy resin composition obtained, and also large in the effect of enhancing tackiness preferably.

Furthermore, a soft segment with a polyether structure, that is, a soft segment with its structure represented by said general formula (IV) or (VII) is excellent in the solubility into the epoxy resin preferably.

Moreover, a hard segment with its structure represented by said general formula (I) or (III), especially with its structure represented by said general formula (III) in the case of the first version of the present invention is preferable since the epoxy resin composition obtained is excellent in adhesiveness to the reinforcing fibers, while a soft segment with its structure represented by said general formula (IV) or (VII) is preferable since it is excellent in the solubility into the epoxy resin. Above all, a block copolymer using a hard segment component with its structure represented by said general formula (III) and a soft segment component with its structure represented by said general formula (IV) in combination is especially preferable since it can satisfy all of heat resistance, tackiness improving effect, adhesiveness and solubility.

The thermoplastic elastomers structurally as described above can be synthesized by known methods. Typical methods are stated in Japanese Patent Publication Nos. 48-4115, and 48-4116, and Japanese Patent Laid-Open Nos. 47-25295, 48-29896, 48-19696, 48-29896, 50-159586, 51-111894, 51-127198, 51-144490, 52-45693, 55-147546, 55-133424, and 3-47835, etc.

Furthermore, many marketed products can also be used. Marketed polyester based thermoplastic elastomers include "Hytrel" of Du Pont-Toray, "Pelprene" of Toyobo, "ARNITEL" of AKZO, and "LOMOND" of General Electric. Marketed polyamide based thermoplastic elastomers include "VESTAMID" of Huels, "PEBAX" of ATOCHEM, "Grilux A" of EMS, "NOVAMID" of Mitsubishi Kasei, etc. They have the following chemical structures:

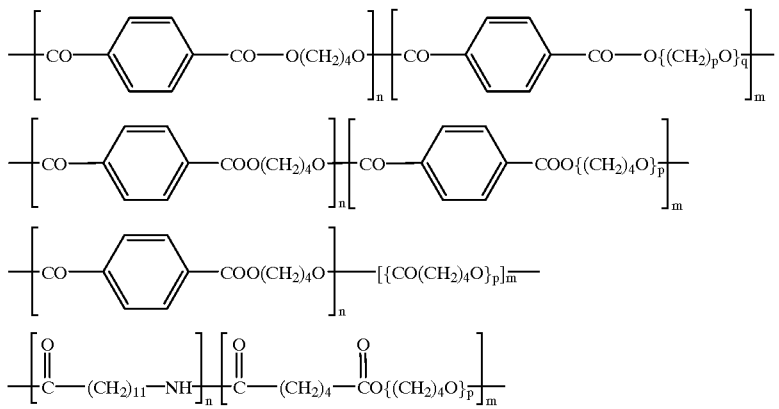

Plural ones of these polyester based thermoplastic elastomers or polyamide based thermoplastic elastomers can be used in combination.

The epoxy resin composition of the present invention can be obtained, for example, by adding a polyester based or polyamide based elastomer, and as required, a thermoplastic resin to a heated epoxy resin, mixing once into a homogeneous solution, lowering the temperature to such an extent that no curing reaction occurs, adding a curing agent and, as required, a curing accelerator, and mixing them.

Therefore, it is preferable that the polyester based or polyamide based thermoplastic elastomer used is thermodynamically soluble in the epoxy resin at least at the elevated temperature caused during addition and mixing. Furthermore, it is preferable that the thermoplastic elastomer has a solubility higher than a certain level, since if it is remarkably low in solubility even if soluble, the effect of sufficiently improving tackiness cannot be obtained. As an indicator for selectively using a polyester based or polyamide based thermoplastic elastomer high in solubility, a solubility parameter Sp value which can be calculated from the molecular structure can be used. To obtain sufficient solubility, it is preferable that the difference in absolute value between the Sp value of all the thermoplastic elastomers used and the Sp value of all the epoxy resins used is in a range from 0 to 2, more preferably 0 to 1.5.

The difference between Sp values in absolute value can be kept small by optimizing the selection and mixing ratio of raw materials of the epoxy resin and optimizing the selection and copolymerizing ratio of copolymer components of the thermoplastic elastomer. When plural epoxy resins or plural thermoplastic elastomers are used, the average value of the Sp values of the epoxy resins calculated as the sum of the values obtained by multiplying the Sp values of the respective epoxy resins by the respective weight percentages can be compared with the Sp values of the individual thermoplastic resins, to obtain the differences.

The epoxy resin composition containing a polyester based or polyamide based thermoplastic elastomer as described above is excellent in tackiness, but low in viscosity, being excellent also in drapability and impregnability into the reinforcing fibers. Compared to an epoxy resin composition not containing any thermoplastic elastomer, the epoxy resin composition of the present invention is small in the changes of viscoelasticity functions in relation with temperature, especially the change at about room temperature, and so a stable prepreg small in dependence on temperature can be obtained preferably.

Therefore, the prepreg obtained by using the epoxy resin composition of the present invention can exhibit excellent properties in addition to good tackiness, drapability and quality. To obtain these effects, it is preferable to use 1 to 20 parts by weight of a polyester based or polyamide based elastomer against 100 parts by weight of an epoxy resin.

On the other hand, a fiber reinforced composite material obtained by curing the prepreg obtained by using an epoxy resin composition containing a polyester based thermoplastic elastomer or polyamide based thermoplastic elastomer tends to be low in inter-layer shear strength, 90° tensile strength, 0° compressive strength, etc. compared to that obtained by using a matrix resin not containing any thermoplastic elastomer. The low physical properties are estimated to be caused by the insufficient adhesiveness between the matrix resin and the reinforcing fibers.

If a fiber reinforced composite material obtained by using a polyester based thermoplastic elastomer aid that obtained by using a polyamide based thermoplastic elastomer are compared, the latter is preferable since it is higher in such physical properties as inter-layer shear strength, 90° tensile strength, 0° compressive strength, etc., and a fiber reinforced composite material obtained by using a polyamide based thermoplastic elastomer with a structure represented by said general formula (III) is especially preferable since these physical properties can be further improved.

Furthermore, to obtain a composite material excellent in physical properties such as mechanical properties while the excellent tackiness of the epoxy resin composition containing a polyester based or polyamide based thermoplastic elastomer is maintained, it is effective to add a thermoplastic resin thermodynamically soluble in the epoxy resin, especially a thermoplastic resin with hydrogen bondable functional groups. The reason is surmised to be that the adhesiveness between the matrix resin and the reinforcing fibers is improved.

The hydrogen bondable functional groups include alcoholic hydroxyl groups, amide groups, imide groups, sulfonyl groups, etc.

Thermoplastic resins with alcoholic hydroxyl groups include polyvinyl acetal resins such as polyvinyl formal, and polyvinyl butyral, and phenoxy resin. Thermoplastic resins with amide groups include polyimides. Thermoplastic resins with imide groups include polyimides. Thermoplastic resins with sulfonyl groups include polysulfones. The polyamides, polyimides and polysulfones may also have ether bonds or functional groups such as carbonyl groups in the main chain. The polyamides may have substituent groups at the nitrogen atoms of the amide groups.

Marketed thermoplastic resins soluble in the epoxy resin and with hydrogen bondable functional groups include "Denka Butyral" and "Denka Formal" (produced by Denki Kagaku Kogyo K.K.), and "Vinyled" (produced by Chisso K.K.) as polyvinyl acetal resins, "UCAR" PKHP (produced by Union Carbide) as a phenoxy resin, "Macromelt" (produced by Henckel Hakusui K.K.), and "Amilan" CM4000 (produced by Toray Industries, Inc.) as polyamide resins, "Ultem" (produced by General Electric), and "Matrimide" 5218 (produced by Ciba) as polyimides, "Victrex" (produced by Mitsui Toatsu Chemicals, Inc.), and "UDEL" (produced by Union Carbide) as polysulfones. They have the following chemical structures:

Among such thermoplastic resins, those with an elastic modulus of 10 MPa or more at 25° C. are preferable since the elastic modulus of the cured epoxy resin composition is less lowered.

It is preferable that the thermoplastic resin is thermodynamically soluble in the epoxy resin at least at the high temperature caused during addition and mixing. Since a sufficient effect of improving the physical properties of the composite material cannot be obtained if the thermoplastic resin is remarkably low in solubility even if it is soluble, it is preferable that the thermoplastic resin has a solubility higher than a certain level. As an indicator for selectively using a thermoplastic resin high in solubility, a solubility parameter Sp value which can be calculated from the molecular structure can be used. To obtain sufficient solubility, it is preferable that the difference in absolute value between the Sp value of all the thermoplastic resins used and the Sp value of all the epoxy resins is in a range from 0 to 2, more preferably 0 to 1.5.

The difference between Sp values in absolute value can be kept small by optimizing the selection and mixing ratio of

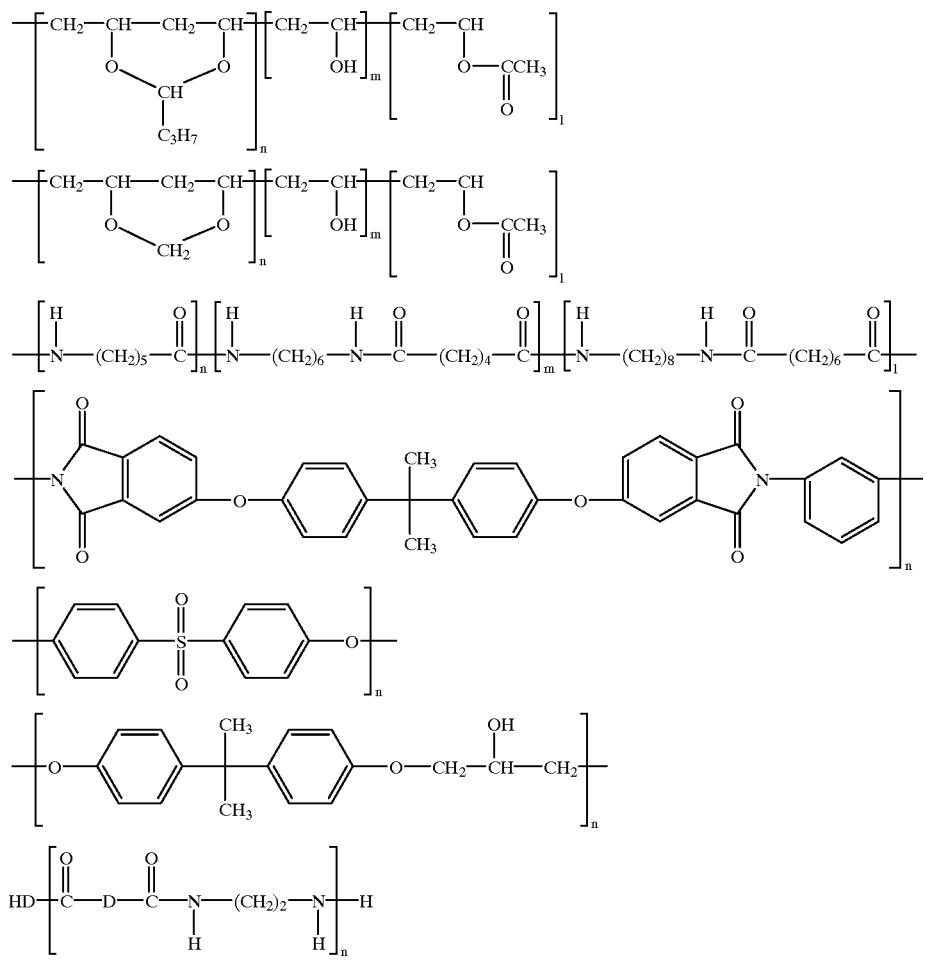

D stands for a hydrocarbon group with 32 carbon atoms in the molecule of dimer acid.

As a polyvinyl acetal resin, polyvinyl formal resin containing 60 wt % or more of vinyl formal portion is preferable since it is excellent in mechanical properties.

raw materials of the epoxy resin and selecting the structure of the thermoplastic elastomer. When plural epoxy resins or plural thermoplastic elastomers are used, the average value of the Sp values of the epoxy resins calculated as the sum of the values obtained by multiplying the Sp values of the respective epoxy resins by the respective weight percentages can be compared with the Sp values of the individual thermoplastic resins, to obtain the differences.

The solubility parameter reflects the magnitude of polarity of the molecular structure. Since an epoxy resin has a structure large in polarity, it is preferable that the thermoplastic resin used has a structure with a polar component moderately in the molecular structure.

Moreover, when the differences among the three Sp values of the epoxy resin, thermoplastic elastomer and thermoplastic resin used are preferably 0 to 2, more preferably 0 to 1.5 respectively, the prepreg and the composite material obtained are excellent in physical properties preferably.

When a thermoplastic resin is used, it is preferable to add 1 to 20 parts by weight of a thermoplastic resin against 100 parts by weight of an epoxy resin, because a moderate viscoelasticity parameter can be given to the epoxy resin composition and because the composite material obtained is good in physical properties.

The epoxy resin composition of the present invention can contain such additives as a high polymer, reactive diluent, antioxidant, and organic or inorganic particles in addition to the above epoxy resin, curing agent, polyester based or polyamide based thermoplastic elastomer, and thermoplastic resin.

The high polymer can be a compound which can be dissolved in the epoxy resin for various purposes. For example, an amino functional silicone resin for giving toughness stated in European Patent No. 475611 (corresponding to Japanese Patent Laid-Open No. 6-93103) can be used.

As the reactive diluent, a mono-functional epoxy compound can be preferably used, which can be selected, for example, from butyl glycidyl ether, 2-ethylhexyl glycidyl ether, phenyl glycidyl ether, cresyl glycidyl ether, p-sec-butyl glycidyl ether, p-tert-butyl glycidyl ether, etc.

The antioxidant can be preferably selected from phenol based antioxidants such as 2,6-di-tert-butyl-p-cresol (BHT), butylated hydroxyanisole, and tocophenol, and sulfur based antioxidants such as dilauryl 3,3'-thiodipropionate, and distearyl 3,3'-thiodipropionate.

The organic particles can be fine particles of a thermoplastic resin, thermosetting resin or elastomer, etc. The thermoplastic resin particles can be particles of polyamide resins, and thermosetting resin particles can be particles of cured epoxy resin or phenol resin, etc. The elastomer particles can be crosslinked rubber particles, or core-shell type rubber particles obtained by covering an elastomer such as butyl acrylate copolymer with a non-elastomer high polymer such as polymethyl acrylate. These organic particles are used mainly for improving toughness.

The inorganic particles can be particles of silica, alumina, smectite, synthetic mica, etc. These inorganic particles are used mainly for control of rheology, that is, increasing viscosity and giving thixotropy.

Such properties as tackiness, drapability, impregnability, and resin flow of the prepreg have correlation with the viscoelasticity of the matrix resin, and a parameter concerning viscoelasticity is important for design of resin. For measuring the viscoelasticity of a resin, usually dynamic viscoelasticity measurement using parallel discs is used. The dynamic viscoelasticity depends on the measuring temperature and measuring frequency. As values representing the viscoelasticity behavior at about room temperature, the complex coefficient of viscosity $\eta^*$ and the energy loss tan $\delta$ at a measuring temperature of 50° C. at a measuring frequency of 0.5 Hz are used, and when they are in specific ranges, a prepreg especially excellent in said properties can be obtained preferably.

The complex coefficient of viscosity $\eta^*$ has particular correlation with drapability. To secure moderate drapability, it is preferable that the complex coefficient of viscosity $\eta^*$ is 1000 to 30000 poises, more preferably 2000 to 20000 poises. In the case of a highly viscous resin exceeding this range in the complex coefficient of viscosity $\eta^*$, the prepreg is insufficient in drapability, and may not be smoothly impregnated into the reinforcing fibers. If the complex coefficient of viscosity $\eta^*$ is lower than the range, the prepreg may be insufficient in tackiness, and moreover when the prepreg sheets are unidirectional, their capability to hold the form may be lowered.

On the other hand, the energy loss tan $\delta$ has particular correlation with tackiness, and a prepreg using a matrix resin small in the energy loss tan $\delta$ tends to be excellent in tackiness.

It is especially preferable, in view of achieving high tackiness together with high drapability, to keep the complex coefficient of viscosity $\eta^*$ in said range for maintaining high drapability and to keep the energy loss tan $\delta$ in a range from 0.3 to 10, more preferably 0.3 to 5. If the energy loss tan $\delta$ exceeds this range, the prepreg may be insufficient in tackiness, etc., and it is actually difficult to prepare an epoxy resin composition lower than the range.

To optimize the complex coefficient of viscosity $\eta^*$ and the energy loss tan $\delta$, for example, the following methods can be used.

The complex coefficient of viscosity $\eta^*$ can be controlled by properly selecting the kind, viscosity, molecular weight and amount of the epoxy resin used, and the kind, molecular weight, amount, etc. of the thermoplastic elastomer or thermoplastic resin used. If their molecular weights or amounts is larger, the complex coefficient of viscosity $\eta^*$ tends to be larger.

The energy loss tan $\delta$ can be controlled by properly selecting the kind, amount, etc. of the thermoplastic elastomer or thermoplastic resin used. If the amount is larger, the energy loss tan $\delta$ tends to be smaller. Especially a thermoplastic elastomer is larger in the effect of lowering the energy loss tan $\delta$ than a thermoplastic resin when both are the same in amount, and so the adjusting the amount of the thermoplastic elastomer is effective for optimizing the energy loss tan $\delta$.

As described before, the dependence of the viscoelasticity functions at about room temperature of the epoxy resin composition of the present invention on the temperature is small, and this is preferable since the handling convenience is not worsened preferably even if the temperature of the working environment for handling the prepreg varies. As indicators for showing the dependence of the viscoelasticity functions at about room temperature on the temperature, the value of $d(\ln \eta^*)/dT$ can be introduced as the temperature change of the complex coefficient of viscosity $\eta^*$ observed in dynamic viscoelasticity measurement at a heating rate of 1.5° C./min and a measuring frequency of 0.5 Hz, and $d(\tan \delta)/dT$ at 50° C. as the temperature change of energy loss tan $\delta$. To lessen the dependence of handling convenience on the temperature, it is preferable that $d(\ln \eta^*)/dT$ is in a range from −0.15 to 0 with $d(\tan \delta)dT$ in a range from −0.50 to 0.20, and it is more preferable that $d(\ln \eta^*)/dT$ is in a range from −0.13 to 0 with $d(\tan \delta)dT$ in a range from 0.15 to 0.15.

The epoxy resin composition with the respective values in these ranges can be obtained by optimizing the kind, amount, etc. of the polyester based or polyamide based thermoplastic elastomer which is effective for lessening the dependence of viscoelasticity functions at about room temperature on the temperature.

If the epoxy resin composition of the present invention is used, a prepreg excellent in tackiness and drapability, good in windability around the mandrel and also good in the physical properties after curing can be obtained even when carbon fibers high in elastic modulus are used as the reinforcing fibers or even when the rein forcing fiber content is high.

If the epoxy resin composition of the present invention is impregnated into reinforcing fibers, a prepreg can be obtained. The reinforcing fibers can be carbon fibers, but can also be selected from glass fibers, aramid fibers, boron fibers, alumina fibers, silicon carbide fibers, etc. The style of the reinforcing fibers can be paralleled long fibers, tow, woven fabric, mat, knitted fabric, or braid, etc.

To produce sporting goods light in weight such as golf shafts and fishing rods, it is preferable to use reinforcing fibers high in elastic modulus for the prepreg for securing sufficient product rigidity by small amounts of materials. The elastic modulus of the reinforcing fibers is preferably 340 to 600 MPa, more preferably 360 to 600 MPa, further more preferably 370 to 600 MPa.

Especially when carbon fibers are used as reinforcing fibers, the strength and elastic modulus of the fiber reinforced composite material obtained greatly depend on the carbon fiber content. Therefore, as far as a certain amount of reinforcing fibers are contained, if the amount of the matrix resin to be impregnated is smaller, the product weight can be reduced while the composite material and final product are kept almost constant in performance. For this purpose, a prepreg high in reinforcing fiber content can be preferably used. In this case, the reinforcing fiber content of the prepreg is preferably 60 to 90 wt %, more preferably 67 to 80 wt %. If a prepreg high in reinforcing fiber content is prepared by using the epoxy resin composition of the present invention, the prepreg obtained can be more excellent in handling convenience such as tackiness and drapability and also in the physical properties after curing than the conventional prepregs.

By impregnation of the epoxy resin composition of the present invention into reinforcing fibers, a prepreg as an intermediate material of the fiber reinforced composite material can be produced.

The prepreg can be produced by dissolving the epoxy resin composition of the present invention into a solvent such as methyl ethyl ketone or methanol for lowering the viscosity for impregnation (wet method) or by heating for lowering the viscosity for impregnation (hot melt method= dry method) and so on.

In the wet method, the reinforcing fibers are immersed into the epoxy resin composition solution and raised, and the solvent is evaporated using an oven, etc. for obtaining the prepreg.

In the hot melt method, releasing paper, etc. is coated with the epoxy resin composition, to make a film, and the film is overlapped on the reinforcing fibers on both sides or one side and heated and pressurized, to prepare a prepreg impregnated with the resin.

The fiber reinforced composite material can be produced by laminating cut prepreg sheets as a pattern, and heating and curing the resin while pressurizing the laminate.

The heat and pressure can be given by press forming, autoclave, bagging, sheet winding, internal pressure molding, etc. Especially for sporting goods, sheet winding and internal pressure molding can be preferably adopted.

In the sheet winding, prepreg sheets are wound around a mandrel, to form a cylindrical material, and this method is ideal for preparing a rod such as a golf shaft or fishing rod. Concretely, prepreg sheets are wound around a mandrel and fixed not to be separated from the mandrel, and to give molding pressure to the prepreg sheets, a thermoplastic resin film (wrapping tape) is wound around the prepreg sheets. Then, the resin is heated and cured in an oven, and the mandrel is pulled out to obtain a molded cylindrical product.

In the internal pressure molding method, prepreg sheets are wound around a bag-like internal pressurizer made of a thermoplastic resin, and set in a mold, and high pressure air is introduced into the internal pressurizer for pressurization while the mold is heated for molding. The internal pressure molding method can be preferably used for specially formed golf shafts and bats, especially complicatedly formed products such as rackets for tennis, badminton, etc.

EXAMPLE

The present invention is described below in more detail in reference to examples. The methods for measuring physical properties such as dynamic viscoelasticity, temperature changes of viscoelasticity functions, and solubility parameter, and the methods for evaluating tackiness, drapability, etc. were as follows:

A. Dynamic viscoelasticity and temperature changes of viscoelasticity functions

The dynamic viscoelasticity was measured by using Dynamic Analyzer Model RDAII produced by Rheometrics. For measurement, parallel discs of 25 mm in radius were used, and the complex coefficient of viscosity $\eta^*$ and energy loss tan $\delta$ were obtained at a measuring temperature of 50° C. and a measuring frequency of 0.5 Hz.

For the temperature changes of viscoelasticity functions, similar measurement was effected at a heating rate of 1.5° C./min. and a measuring frequency of 0.5 Hz, and particularly the temperature change $d(\ln \eta^*)/dT$ of the complex coefficient of viscosity $\eta^*$ and the temperature change $d(\tan \delta)/dT$ of energy loss tan $\delta$ respectively at 50° C. were obtained.

B. Solubility parameter

The solubility parameter Sp value was obtained based on the Fedors' method stated in Polym. Eng. Sci., 14 (2), 147–154 (1974).

C. Tackiness of prepreg

Prepreg sheets were pressure-bonded together and the force required for separating them was measured. For the measurement, many parameters such as load stress, speed, and time are available. These can be properly decided, considering the condition where the prepreg is used, and so on. For evaluation of tackiness in these examples, "Instron" Model 4201 Universal Testing Machine (produced by Instron Japan K.K.) was used as the measuring instrument, and measurement was effected under the following conditions:

Sample: 50×50 mm

Loading speed: 1 m/m min.

Load for adhesion: 1.2 kgf/cm$^2$ (0.12 MPa)

Loading time: 5±2 sec

Peeling speed: 10 mm/min.

D. Drapability of prepreg

For the evaluation of the drapability of a prepreg, it is desirable to adopt a method to allow sufficient identification of drapability in the working environment of the prepreg. So, in these examples, the drapability was evaluated by measuring the flexural elastic modulus of the prepreg. The flexural elastic modulus measuring method was approximately according to JIS K 7074 "Bending Test Methods for Fiber Reinforced Plastics". However, since a prepreg is usually very thin, the conditions must be set properly. For evaluation in these examples, "Instron" Model 4201 Universal Testing Machine (produced by Instron Japan K.K.) was used as the measuring instrument, and measurement was effected under the following conditions:

Sample: 85 mm (fiber direction)×15 mm

Loading speed: 5 mm/min.

Span length: 40 mm (L/D=40/0.06)

Indenter diameter: 4 mm

With the conditions set as above, tackiness and drapability were measured. However, the conditions must be properly set in reference to the environment where the prepreg is used, the amount and thickness of reinforcing fibers used for the prepreg, etc. Furthermore, this evaluation method can also be used for resin films and adhesive tapes as well as prepregs.

E. Inter-layer shear strength of composite material (ILSS)

The interlayer shear strength of the molded product obtained by molding prepreg sheets was measured according to JIS K 7078.

F. Windability of prepreg around mandrel

The windability of a prepreg around a mandrel was evaluated as follows.

The prepreg was wound around a steel cylinder of 10 mm in diameter and 1000 mm in length in an atmosphere of 23° C. and 40% RH with the parallel direction of the reinforcing fibers kept at an angle of 45° against the longitudinal direction of the cylinder, and allowed to stand for 3 hours, to observe the state of winding. The criterion was as follows:

Separation did not occur at the end . . . o

Partial separation occurred at the end . . . Δ

Separation occurred at the end . . . x

G. Tensile strength of composite material

The tensile strength of the molded product obtained by molding a prepreg was measured according to JIS K 7073 "Tension Testing Methods for Carbon Fiber Reinforced Plastics".

H. Compressive strength of composite material

The compressive strength of the molded product obtained by molding a prepreg was measured according to JIS K 7076 "In-Plain Compression Testing Methods for Carbon Fiber Reinforced Plastics".

EXAMPLE 1

(1) Preparation of matrix resin composition

The following raw materials were kneaded using a kneader, to prepare a matrix resin composition.

| | |
|---|---|
| Bisphenol A type epoxy resin ("Epikote" 828 produced by Yuka Shell Epoxy K.K.) | 35 parts by weight |
| Bisphenol A type epoxy resin ("Epikote" 1001 produced by Yuka Shell Epoxy K.K.) | 30 parts by weight |
| Phenol novolak type epoxy resin ("Epikote" 154 produced by Yuka Shell Epoxy K.K.) | 35 parts by weight |
| Polyester based thermoplastic elastomer ("Hytrel" HTC2551 produced by Du Pont-Toray Co., Ltd.) | 4 parts by weight |
| Polyvinyl formal resin ("Vinylec" K produced by Chisso K.K) | 4 parts by weight |
| Dicyandiamide | 4 parts by weight |
| DCMU | 4 parts by weight |

(2) Preparation of prepreg

The above resin composition was applied onto releasing paper using a reverse roll coater, to prepare a resin film. Subsequently the resin film was overlapped on both sides of carbon fibers "Torayca" M40J-6K (produced by Toray Industries, Inc.) of 40,000 kgf/mm² (378 MPa) in elastic modulus arranged in one direction, and was heated and pressurized at 130° C. and 4 kgf/cm² for impregnating the fibers with the resin, to prepare a prepreg of 76 wt % in reinforcing fiber content.

The prepreg was good in tackiness, drapability and windability around a mandrel.

(3) Preparation of fiber reinforced composite material

The prepreg was cut, and the cut sheets were laminated and molded in an autoclave at a temperature of 135° C. at a pressure of 3 kgf/cm² for 2 hours. The inter-layer shear strength (ILSS) of the molded product was measured according to JIS K 7078. The value of ILSS obtained was 7.5 kgf/mm² (73.5 MPa).

EXAMPLE 2

(1) Preparation of matrix resin composition

The following raw materials were kneaded using a kneader, to prepare a matrix resin composition.

| | |
|---|---|
| Bisphenol A type epoxy resin ("Epikote" 828 produced by Yuka Shell Epoxy K.K.) | 35 parts by weight |
| Bisphenol A type epoxy resin ("Epikote" 1001 produced by Yuka Shell Epoxy K.K.) | 30 parts by weight |
| Phenol novolak type epoxy resin ("Epikote" 154 produced by Yuka Shell Epoxy K.K.) | 35 parts by weight |
| Polyester based thermoplastic elastomer ("Hytrel" HTC2551 produced by Du Pont-Tray Co., Ltd.) | 5 parts by weight |
| Polyether sulfone ("Victrex" PES5003P produced by Mitsui Toatsu Chemicals, Inc.) | 3 parts by weight |
| Dicyandiamide | 4 parts by weight |
| DCMU | 4 parts by weight |

(2) Preparation of prepreg

A prepreg was prepared as done in Example 1. The prepreg was good in tackiness, drapability and windability around a mandrel (see Table 1).

(3) Preparation of fiber reinforced composite material

A fiber reinforced composite material was prepared as done in Example 1. The value of ILSS obtained was 7.2 kgf/mm² (70.6 MPa).

EXAMPLE 3

(1) Preparation of matrix resin composition

The following raw materials were kneaded using a kneader, to prepare a matrix resin composition.

| | |
|---|---|
| Bisphenol A type epoxy resin ("Epikote" 828 produced by Yuka Shell Epoxy K.K.) | 30 parts by weight |
| Bisphenol A type epoxy resin ("Epikote" 1001 produced by Yuka Shell Epoxy K.K.) | 35 parts by weight |
| Phenol novolak type epoxy resin ("Epikote" 154 produced by Yuka Shell Epoxy K.K.) | 35 parts by weight |
| Polyester based thermoplastic elastomer ("Pelprene" S2001 produced by Toyobo.) | 5 parts by weight |
| Polyvinyl formal resin ("Vinylec" K produced by Chisso K.K.) | 5 parts by weight |
| Dicyandiamide | 4 parts by weight |
| DCMU | 4 parts by weight |

(2) Preparation of prepreg

A prepreg was prepared as done in Example 1. The prepreg was good in tackiness, drapability and windability around a mandrel.

(3) Preparation of fiber reinforced composite material

A fiber reinforced composite material was prepared as done in Example 1. The value of ILSS obtained was 7.4 kgf/mm$^2$ (72.5 MPa).

COMPARATIVE EXAMPLE 1

(1) Preparation of matrix resin composition

The following raw materials were kneaded using a kneader, to prepare a matrix resin composition.

| | |
|---|---|
| Bisphenol A type epoxy resin ("Epikote" 828 produced by Yuka Shell Epoxy K.K.) | 35 parts by weight |
| Bisphenol A type epoxy resin ("Epikote" 1001 produced by Yuka Shell Epoxy K.K.) | 30 parts by weight |
| Phenol novolak type epoxy resin ("Epikote" 154 produced by Yuka Shell Epoxy K.K.) | 35 parts by weight |
| Polyvinyl formal resin ("Vinylec" K produced by Chisso K.K.) | 5 parts by weight |
| Dicyandiamide | 4 parts by weight |
| DCMU | 4 parts by weight |

(2) Preparation of prepreg

A prepreg was prepared as done in Example 1. The prepreg was weak in tackiness, hence poor in handling convenience. Furthermore since it was low in drapability and hard, it was poor in windability around a mandrel.

(3) Preparation of fiber reinforced composite material

A fiber reinforced composite material was prepared as done in Example 1. The value of ILSS obtained was 7.9 kgf/mm$^2$ (77.5 MPa).

COMPARATIVE EXAMPLE 2

(1) Preparation of matrix resin composition

The following raw materials were kneaded using a kneader, to prepare a matrix resin composition.

| | |
|---|---|
| Bisphenol A type epoxy resin ("Epikote" 828 produced by Yuka Shell Epoxy K.K.) | 30 parts by weight |
| Bisphenol A type epoxy resin ("Epikote" 1001 produced by Yuka Shell Epoxy K.K.) | 35 parts by weight |
| Phenol novolak type epoxy resin ("Epikote" 154 produced by Yuka Shell Epoxy K.K.) | 35 parts by weight |
| Polyvinyl formal resin ("Vinylec" K produced by Chisso K.K.) | 10 parts by weight |
| Dicyandiamide | 4 parts by weight |
| DCMU | 4 parts by weight |

(2) Preparation of prepreg

A prepreg was prepared as done in Example 1. The prepreg was good in tackiness. However, since it was hard and poor in drapability, it was poor in windability around a mandrel.

(3) Preparation of fiber reinforced composite material

A fiber reinforced composite material was prepared as done in Example 1. The value of ILSS obtained was 7.8 kgf/mm$^2$ (76.5 MPa).

EXAMPLE 4

(1) Preparation of matrix resin composition

The following raw materials were kneaded using a kneader, to prepare a matrix resin composition.

| | |
|---|---|
| Bisphenol A type epoxy resin ("Epikote" 828 produced by Yuka Shell Epoxy K.K.) | 30 parts by weight |
| Bisphenol A type epoxy resin ("Epikote" 1001 produced by Yuka Shell Epoxy K.K.) | 35 parts by weight |
| Phenol novolak type epoxy resin ("Epikote" 154 produced by Yuka Shell Epoxy K.K.) | 35 parts by weight |
| Polyamide based thermoplastic elastomer ("PEBAX 4033" produced by ATOCHEM) | 10 parts by weight |
| Dicyandiamide | 4 parts by weight |
| DCMU | 4 parts by weight |

(2) Preparation of prepreg

A prepreg was prepared as done in Example 1. The prepreg was good in tackiness, drapability and windability around a mandrel.

(3) Preparation of fiber reinforced composite material

A fiber reinforced composite material was prepared as done in Example 1. The value of ILSS obtained was 7.0 kgf/mm$^2$ (68.6 MPa).

EXAMPLE 5

(1) Preparation of matrix resin composition

The following raw materials were kneaded using a kneader, to prepare a matrix resin composition.

| | |
|---|---|
| Bisphenol A type epoxy resin ("Epikote" 828 produced by Yuka Shell Epoxy K.K.) | 35 parts by weight |
| Bisphenol A type epoxy resin ("Epikote" 1001 produced by Yuka Shell Epoxy K.K.) | 30 parts by weight |
| Phenol novolak type epoxy resin ("Epikote" 154 produced by Yuka Shell Epoxy K.K.) | 35 parts by weight |
| Polyamide based thermoplastic elastomer ("PEBAX" 4033 produced by ATOCHEM) | 4 parts by weight |
| Polyvinyl formal resin ("Vinylec" K produced by Chisso K.K.) | 4 parts by weight |
| Dicyandiamide | 4 parts by weight |
| DCMU | 4 parts by weight |

(2) Preparation of prepreg

A prepreg was prepared as done in Example 1. The prepreg was good in tackiness, drapability and windability around a mandrel.

(3) Preparation of fiber reinforced composite material

A fiber reinforced composite material was prepared as done in Example 1. The value of ILSS obtained was 7.9 kgf/mm$^2$ (77.5 MPa).

COMPARATIVE EXAMPLE 3

(1) Preparation of matrix resin composition

The following raw materials were kneaded using a kneader, to prepare a matrix resin composition.

| | |
|---|---|
| Bisphenol A type epoxy resin ("Epikote" 828 produced by Yuka Shell Epoxy K.K.) | 30 parts by weight |
| Bisphenol A type epoxy resin ("Epikote" 1001 produced by Yuka Shell Epoxy K.K.) | 35 parts by weight |
| Phenol novolak type epoxy resin ("Epikote" 154 produced by Yuka Shell Epoxy K.K.) | 35 parts by weight |

-continued

| | |
|---|---|
| Polyester based thermoplastic elastomer ("Hytrel" HTC2551 produced by Du Pont-Toray Co., Ltd.) | 5 parts by weight |
| Dicyandiamide | 4 parts by weight |
| DCMU | 4 parts by weight |

(2) Preparation of prepreg

A prepreg was prepared as done in Example 1. The prepreg was weak in tackiness, hence poor in handling convenience. Furthermore, since the tackiness was weak, it was poor in windability around a mandrel.

(3) Preparation of fiber reinforced composite material

A fiber reinforced composite material was prepared as done in Example 1. The value of ILSS obtained was 6.8 kgf/mm² (66.7 MPa).

COMPARATIVE EXAMPLE 4

(1) Preparation of matrix resin composition

The following raw materials were kneaded using a kneader, to prepare a matrix resin composition.

| | |
|---|---|
| Bisphenol A type epoxy resin ("Epikote" 828 produced by Yuka Shell Epoxy K.K.) | 30 parts by weight |
| Bisphenol A type epoxy resin ("Epikote" 1001 produced by Yuka Shell Epoxy K.K.) | 35 parts by weight |
| Phenol novolak type epoxy resin ("Epikote" 154 produced by Yuka Shell Epoxy K.K.) | 35 parts by weight |
| Dicyandiamide | 4 parts by weight |
| DCMU | 4 parts by weight |

(2) Preparation of prepreg

A prepreg was prepared as done in Example 1. The prepreg was weak in tackiness, hence poor in handling convenience. Furthermore, since the tackiness was weak, it was poor in windability around a mandrel.

(3) Preparation of fiber reinforced composite material

A fiber reinforced composite material was prepared as done in Example 1. The value of ILSS obtained was 8.0 kgf/mm² (78.4 MPa).

EXAMPLES 6 THROUGH 8

Prepregs and fiber reinforced composite materials were obtained as done in Example 1, except that the matrix resin composition was changed (see Table 1). As shown in Table 3, all the prepregs were good in tackiness, drapability and windability around a mandrel, and the composite materials were also good in physical properties. However, in Example 8, since the complex coefficient of viscosity η* was rather high, the physical properties of the prepreg were rather insufficient even though the physical properties of the composite material were excellent.

COMPARATIVE EXAMPLES 5 AND 6

Prepregs and fiber reinforced composite materials were obtained as done in Example 1, except that the matrix resin composition was changed (see Table 2). As shown in Table 4, in Comparative Example 5, though drapability and windability around a mandrel were good, the physical properties of the composite material were insufficient. In Comparative Example 6, the drapability of the prepreg was good and the physical properties of the composite material were excellent. However, since the prepreg was weak in tackiness, it was poor in windability around a mandrel.

INDUSTRIAL APPLICABILITY

The epoxy resin composition of the present invention, if impregnated into reinforcing fibers such as glass fibers or carbon fibers, can be ideally used especially as the matrix resin of a prepreg. Sheets of the prepreg can be laminated to be processed into a fiber reinforced composite material or wound around a mandrel, to be processed for ideal use as a rod or shaft, etc.

We claim:

1. A prepreg consisting essentially of reinforcing fibers impregnated with an epoxy resin composition as a matrix, a polyamide block copolymer based thermoplastic elastomer and a curing agent.

2. A prepreg of claim 1, wherein said polyamide based thermoplastic elastomer is a block copolymer comprising a hard segment and a soft segment, said hard segment comprising at least one structural component selected from the group consisting of the following general formulae (I) to (III):

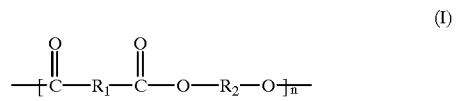
(I)

where $R_1$ stands for a divalent aromatic group; and R2, an alkylene group with 2 to 4 carbon atoms;

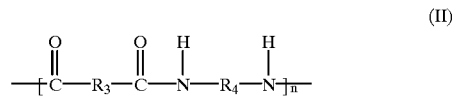
(II)

where $R_3$ and $R_4$ stand for, respectively independently, an alkylene group with 2 to 10 carbon atoms; and

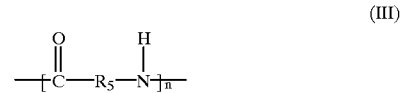
(III)

where $R_5$ stands for an alkylene group with 2 to 12 carbon atoms; and wherein m of general formulae (IV) to (VII) is at least one.

3. A prepreg of claim 2, wherein said polyamide based thermoplastic elastomer is a block copolymer comprising a hard segment and a soft segment, said soft segment comprising at least one structural component selected from the group consisting of the following general formulae (IV) to (VII):

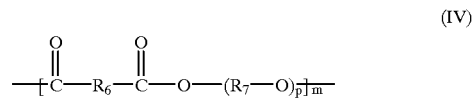
(IV)

where $R_6$ stands for a divalent aromatic group or alkylene group with 2 to 12 carbon atoms; $R_7$, an alkylene group with 2 to 4 carbon atoms; and p, an integer of 2 or more;

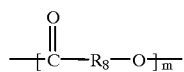
(V)

where $R_8$ stands for an alkylene group with 2 to 12 carbon atoms;

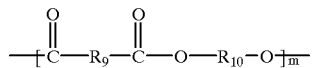
(VI)

where $R_9$ stands for an alkylene group with 2 to 12 carbon atoms; and $R_{10}$, an alkylene group with 2 to 12 carbon atoms; and

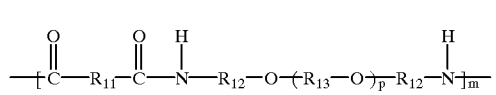
(VII)

where $R_{11}$ stands for an alkylene group with 2 to 12 carbon atoms; $R_{12}$ and $R_{13}$, respectively independently, an alkylene group with 2 to 4 carbon atoms; and p, an integer of 2 or more; and wherein m of general formulae (IV) to (VII) is at least one.

4. A prepreg of claim 2, wherein said polyamide based thermoplastic elastomer has a structural component represented by said general formula (III).

5. A prepreg of claim 1, 2, 3 or 4, wherein said reinforcing fibers are selected from a group consisting of carbon fibers, aromatic polyamide fibers, glass fibers, silicon carbide fibers, boron fibers, alumina fibers and stainless steel fibers.

6. A prepreg of claim 5, wherein said reinforcing fibers are carbon fibers of 360 MPa or more in elastic modulus.

7. A prepreg of claim 5, wherein the reinforcing fiber content is 67 wt % or more.

8. A fiber reinforced composite material comprising:
the prepreg stated in claim 5 cured.

9. A prepreg of claim 1, wherein said polyamide based thermoplastic elastomer is a block copolymer comprising a hard segment and a soft segment and said soft segment comprises at least one structural component selected from the group consisting of the following general formulae (IV) to (VII):

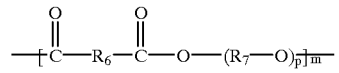
(IV)

where $R_6$ stands for a divalent aromatic group or alkylene group with 2 to 12 carbon atoms; $R_7$, an alkylene group with 2 to 4 carbon atoms; and p, an integer of 2 or more;

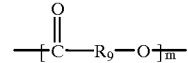
(V)

where $R_8$ stands for an alkylene group with 2 to 12 carbon atoms;

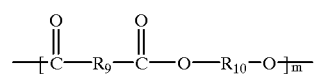
(VI)

where $R_9$ stands for an alkylene group with 2 to 12 carbon atoms; and $R_{10}$, an alkylene group with 2 to 12 carbon atoms; and

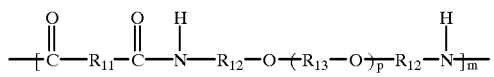
(VII)

where $R_{11}$ stands for an alkylene group with 2 to 12 carbon atoms; $R_{12}$ and $R_{13}$, respectively independently, an alkylene group with 2 to 4 carbon atoms; and p, an integer of 2 or more; and wherein m of general formulae (IV) to (VII) is at least one.

* * * * *